(12) United States Patent
Peirce

(10) Patent No.: US 8,827,213 B2
(45) Date of Patent: Sep. 9, 2014

(54) AIRCRAFT SLAT ASSEMBLY COMPRISING A PLURALITY OF SLATS

(75) Inventor: Robert James Peirce, Radstock (GB)

(73) Assignee: Airbus Operations Limited, Bristol (GB)

( * ) Notice: Subject to any disclaimer, the term of this patent is extended or adjusted under 35 U.S.C. 154(b) by 282 days.

(21) Appl. No.: 13/115,787

(22) Filed: May 25, 2011

(65) Prior Publication Data

US 2011/0290945 A1  Dec. 1, 2011

(30) Foreign Application Priority Data

May 26, 2010 (GB) .................................. 1008775.7

(51) Int. Cl.
B64C 9/26 (2006.01)

(52) U.S. Cl.
USPC ......................................................... 244/213

(58) Field of Classification Search
USPC .................................. 244/213, 214, 216, 217
See application file for complete search history.

(56) References Cited

U.S. PATENT DOCUMENTS

| | | | | |
|---|---|---|---|---|
| 2,969,933 A * | 1/1961 | Vogt | ................... | 244/2 |
| 3,161,373 A * | 12/1964 | Vogt | ................... | 244/2 |
| 4,470,569 A * | 9/1984 | Shaffer et al. | ................. | 244/214 |
| 5,628,477 A * | 5/1997 | Caferro et al. | ................. | 244/214 |
| 5,680,124 A * | 10/1997 | Bedell et al. | ................... | 340/945 |
| 5,686,907 A * | 11/1997 | Bedell et al. | ................... | 340/945 |
| 6,466,141 B1 * | 10/2002 | McKay et al. | ................. | 340/963 |
| 6,483,436 B1 * | 11/2002 | Emaci et al. | ............... | 340/686.1 |
| 7,048,234 B2 * | 5/2006 | Recksiek et al. | ............. | 244/213 |
| 7,331,548 B1 | 2/2008 | Simkulet | | |
| 7,975,958 B2 * | 7/2011 | Sommer | ........................... | 244/3 |
| 2005/0178925 A1 * | 8/2005 | Broadbent | .................... | 244/214 |
| 2011/0290946 A1 * | 12/2011 | Peirce | ........................... | 244/213 |

FOREIGN PATENT DOCUMENTS

| | | |
|---|---|---|
| EP | 0726201 A1 | 8/1996 |
| EP | 1088753 A2 | 4/2001 |

OTHER PUBLICATIONS

UK Search Report for GB1008775.7 dated Aug. 5, 2010.
Extended European Search Report issued Jan. 21, 2014, corresponds to European patent application No. 11167267.1.

* cited by examiner

Primary Examiner — Tien Dinh
Assistant Examiner — Justin Benedik
(74) Attorney, Agent, or Firm — Lowe Hauptman & Ham, LLP

(57) ABSTRACT

An aircraft slat assembly comprises a first slat and a second slat positioned adjacent thereto. The first and second slats are moveable between extended and retracted positions. The slats are connected by a joint, the joint being arranged to transfer a shear load from one slat to the other slat when the slats are urged into a configurations in which there would be differential extension/retraction of the slats, such as a skewed position.

10 Claims, 2 Drawing Sheets

AIRCRAFT SLAT ASSEMBLY COMPRISING A PLURALITY OF SLATS

RELATED APPLICATIONS

The present application is based on, and claims priority from, British Application Number 1008775.7, filed May 26, 2010, the disclosure of which is hereby incorporated by reference herein in its entirety.

TECHNICAL FIELD

The present invention relates to an aircraft slat assembly, and more particularly to an aircraft slat assembly comprising a plurality of slats.

BACKGROUND OF THE INVENTION

It is well known to provide an aircraft slat assembly comprising a plurality of slats located adjacent to one another. The slats are typically moveable (by an actuator mechanism) between an extended position in which the slats are simultaneously deployed, and a retracted position in which the slats are simultaneously stowed on the fixed wing leading edge.

The actuator mechanism for this type of application tends to be extremely robust. In a known design, the actuator mechanism has met all the airworthiness requirements to date, however new airworthiness requirements may now require failure of the actuator mechanism to be considered. In the event of this theoretical failure of the actuator mechanism, differential drive of the slats could occur. This may, for example, lead to skew or misalignment, of one or more of the slats. In theory a failure in the actuator mechanism may also affect (for example, it may isolate) an associated detection and/or protection system; this increases the risk of excessive skew or misalignment occurring.

Detection systems to detect the magnitude of misalignment of slats and to shut down the slat actuator mechanism in the event of excessive misalignment, have been suggested. For example, EP0726201 describes a cable arrangement, in which the displacement of the cable is used to detect when a slat becomes skewed beyond normal limits. The system stops further movement of the slats, once excessive skew has been detected. By way of another example, EP 1088753 describes a skew detection system in which a control computer is arranged to shut down operation of a slat if the slat becomes skewed by more than a predetermined value. The amount of skew is measured by elements on the end of adjacent slats, which slide over one another when a slat becomes skewed, thereby reducing the effective length of a cable. These detection systems can be complex. The above-mentioned systems also rely on a significant degree of skew occurring before further movement of the slats is stopped, which may risk damage to the slat assembly.

SUMMARY OF THE INVENTION

The present invention seeks to mitigate at least some of the above-mentioned problems.

According to a first aspect of the invention, there is provided an aircraft slat assembly comprising a first slat and a second slat positioned adjacent thereto, the first and second slats being moveable between extended and retracted positions, wherein the slats are connected by a joint, the joint being arranged to transfer a shear load from one slat to the other slat when the slats are urged into a configuration in which there would be differential extension/retraction of the slats. By providing such a joint between the slats, the shear load may be detected or otherwise used, to readily identify when there is a risk of differential extension/retraction of the slats developing. Differential extension/retraction of the slats typically results from one end of a slat being actuated more than the other end of the slat; the slat thus being urged into a skewed position. It will be appreciated that the slat need not actually adopt a skewed or misaligned position in order for the shear load to be generated. Thus, embodiments of the invention may enable detection of a condition which may lead to excess skew before such skew actually occurs.

The slat assembly may comprise an actuator assembly arranged to drive the slats between the extended and retracted positions. The slats are preferably arranged to move (during normal operation) between the extended and retracted positions in unison. Differential extension/retraction of the slats may occur as a result of a failure in the actuator assembly. The actuator system may comprise a common drive means arranged to drive both the slats between the extended and retracted positions. For example the actuator assembly may comprise a common drive shaft arranged to both slats simultaneously. Each slat may be operably linked to the drive shaft may by a gearbox. Embodiments of the present invention may be particularly beneficial when using a common drive means, since a malfunction (for example in one of the gearboxes) may mean that an end of one slat continues to be driven, whilst the other end of the slat does not (potentially leading to a skewed configuration).

The slats are preferably track-mounted. Each slat may be mounted on two tracks, the tracks being driveable by the actuator assembly. In an embodiment comprising the common drive means, the tracks may, for example, be operably linked to a common drive shaft.

The slat assembly may comprise a protector system, for example a torque limiter. The protector system is preferably arranged to trip (i.e. stop, shut off, or shut down) at least part of the actuator system (and preferably the entire actuator system) in the event of an excessive load occurring in the actuator system. If a failure in the actuator assembly isolates part of the protector system (for example a torque limiter associated with a jammed slat track), the joint is preferably arranged to transfer the jam load to the adjacent slat, with which another part of the protector system is associated, to thereby cause the actuator system to trip.

The protector system may be arranged to trip the actuator system when the magnitude of the shear load transferred from one slat to the other slat exceeds a threshold magnitude. It will be appreciated that the threshold magnitude need not necessarily relate to the shear load directly and may relate to a load associated with the shear load (such as a torque). The joint is preferably arranged to transfer a sufficient shear load to cause the protector system to trip the actuator assembly.

The joint is preferably located between adjacent ends of the slats. The joint preferably comprises a rigid coupling between the slats, which substantially resists deformation under the shear load. For example, the joint may comprise a shaft extending from one slat into the adjacent slat.

The joint may be arranged to allow relative movement between the slats in a direction along the longitudinal axis of the slats. The joint may be arranged to allow relative rotation between the slats. For example, the shaft may be received in a spherical bearing. The joint may be arranged to allow relative vertical movement between the two slats. By allowing these types of movement between the slats, the joint can accommodate relative movement that arises as a result of thermal and/or aerodynamic distortion of the slats. The shear load transferred between the slats is preferably in the direction of extension/retraction of the slat. The shear load may be in the fore-aft direction.

To facilitate transfer of the shear load between the slats, each slat may comprise a first region proximal to the joint, and a second region distal from the joint, the first region being stiffer than the second region such that deformation of the first region of the slat (under the influence of the shear force) is inhibited. The first region, may, for example comprise stiffening elements.

The slat assembly may comprise a multiplicity of slats, each slat being positioned adjacent to another slat. Adjacent slats may be connected by a joint, the joint being arranged to transfer a shear load from one slat to the adjacent slat when the slats are urged into a configuration in which there would be differential extension/retraction of the slats.

According to another aspect of the invention, there is provided an aircraft slat assembly comprising a first slat and a second slat positioned adjacent thereto, the first and second slats being moveable between extended and retracted positions, wherein the slats are connected by a joint, the joint permitting relative movement between the slats and the joint being arranged to be able to cause one slat to prevent the other slat from adopting a skewed position.

According to yet another aspect of the invention, there is provided an aircraft comprising the slat assembly described herein. The present invention is of greater application to larger aircraft. The aircraft is preferably heavier than 50 tonnes dry weight, and more preferably heavier than 100 tonnes dry weight. The aircraft is preferably of a size equivalent to an aircraft designed to carry more than 75 passengers, and more preferably more than 100 passengers.

According to another aspect of the invention, there is provided a method of protecting an aircraft slat assembly against differential extension/retraction of a first slat located adjacent to a second slat, the method comprising the step of transferring a shear load to one slat from another slat, the shear load being caused by the slats being urged into a configuration in which there would be differential extension/retraction of the slats. In an embodiment in which the slat assembly comprises an actuator assembly, and more preferably a common drive means, arranged to drive both slats between the extended and retracted positions, the method may further include the step of tripping the actuator assembly when the magnitude of the shear load exceeds a threshold magnitude.

The present invention may also be applicable to other aircraft control surfaces, such as trailing edge flaps. According to yet another aspect of the invention, there is provided an aircraft control surface assembly comprising a first control surface (for example a slat or flap), and a second control surface positioned adjacent thereto, the first and second control surfaces being moveable between extended and retracted positions, wherein the control surfaces are connected by a joint, the joint being arranged to transfer a shear load from one control surface to the other control surface when the control surfaces are urged into a configuration in which there would be differential extension/retraction of the control surfaces.

It will be appreciated that any features described with reference to one aspect of the invention are equally applicable to any other aspect of the invention.

DESCRIPTION OF THE DRAWINGS

An embodiment of the invention will now be described, by way of example only, with reference to the accompanying schematic drawings of which.

DETAILED DESCRIPTION

Figure 1:
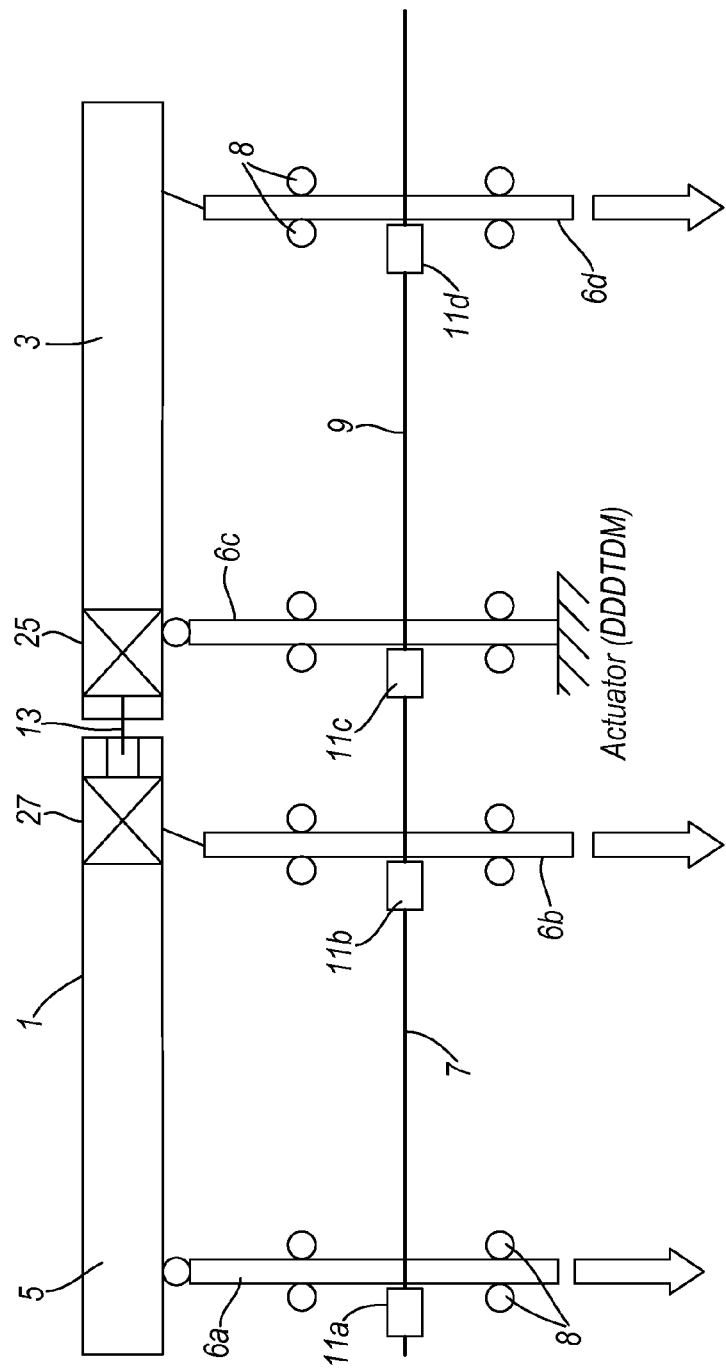
FIG. 1 is a schematic plan view of an aircraft slat assembly according to a first embodiment of the invention.

FIG. 1 is a schematic plan view of an aircraft slat assembly 1 according to a first embodiment of the invention. The slat assembly comprises a first slat 3 and a second slat 5 positioned adjacent to the first slat 3. The slats are moveable between a retracted position (in which the slats are stowed against the fixed wing leading edge (not shown) on an aircraft (not shown)) to an extended position in which both slats are located in front of, and slightly below, the fixed wing leading edge to increase the effective camber of the wing.

The slats 3,5 are track-mounted. The tracks 6a-6d are orientated parallel to one another and are arcuate (although this is not apparent from the plan view in FIG. 1). The tracks are received between pairs of rollers 8 positioned either side of the tracks 6a-6d. The rollers 8 are mounted on the fixed wing structure (not shown).

The slat assembly 1 comprises an actuator system 7 for driving the slats 3,5 between the extended and retracted positions. The actuator system comprises a motor (not shown) which drives a common drive shaft 9, passing through gearboxes 11a-11d, each gearbox being associated with a respective track 6a-6d. The output of each gearbox 11a-11d is a pinion which is meshed with a rack on each track 6a-6d to convert the rotary output of the common drive shaft 9, into translational movement of the tracks (and therefore the slats).

The slat assembly 1 includes a protector system in the form of a plurality of torque limiters (not shown). Each torque limiter is associated with a track 6a-6d, and is arranged to trip the entire actuator assembly 7 in the event of an unduly high torque occurring in the assembly (for example in the event of one of the tracks becoming jammed).

The actuator assembly 7 is extremely robust and meets current airworthiness requirements. New airworthiness requirements may now require failure in the actuator assembly to be considered. In the event of a theoretical failure in the actuator assembly, one of the gearboxes 11a-11d may fail. In such an event, the back driving torque may be sufficiently high to cause a track 6a-6d to jam, or there may be no drive through the failed gearbox. This failure in the gearbox may also isolate the torque limiter associated with that track. These types of failure may lead to a condition referred to as Down Drive Disconnect Through Drive Maintained (DDDTDM).

Referring to FIG. 1, slats 3,5 are shown in an extended position and a failure in the actuator assembly has meant that the left-hand track 6c of the first slat 3 is in a DDDTDM condition. The DDDTDM failure has isolated the torque limiter associated with track 6c. If the failure remains undetected, the common drive shaft of the actuator assembly will differentially retract the tracks 6a-6d, thereby skewing at least the first slat 3 and potentially causing damage to the whole slat assembly structure.

In the first embodiment of the invention, the first and second slats 3,5 are connected by a joint 13. The joint (the structure of which is described in more detail below) is arranged to transfer the shear load, generated as the second slat 5 is urged to retract relative to the left-hand end of the first slat 3 (the retraction being indicated by the large arrows in FIG. 1). The shear load is transferred to the second slat, thereby generating an excessive torque in the gearboxes 11a, 11b associated with that slat, especially in the gearbox 11b closest to the joint 13. This excessive torque is quickly registered by the torque limiter associated with this gearbox 11b, and the torque limiter trips the actuator assembly 7 to prevent excessive skew and/or damage to the slat assembly 1. The first embodiment of the invention therefore provides an arrangement in which a condition which could lead to excessive skew, or other misalignment, is swiftly detected before such excessive skew occurs. Furthermore, the actuator assembly is shut down using part of an existing protection system in the aircraft slat assembly.

Figure 2:
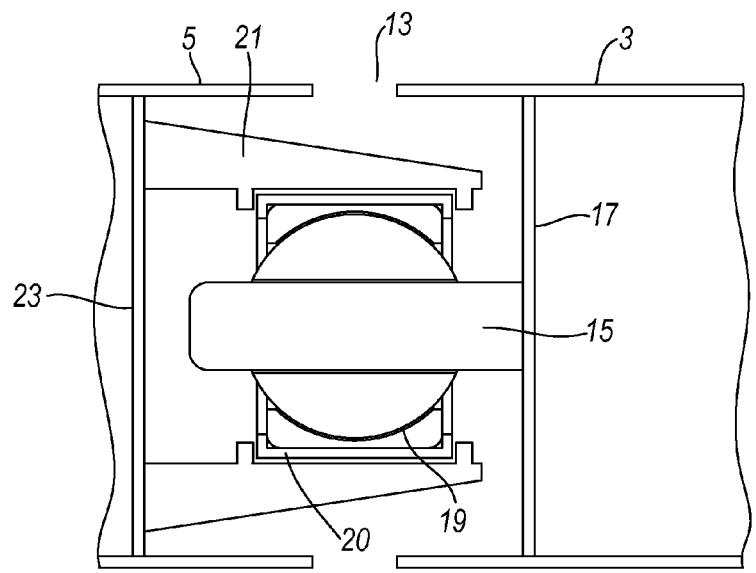
FIG. 2 is a close-up plan view of the joint in the slat assembly of FIG. 1.
Figure 3:
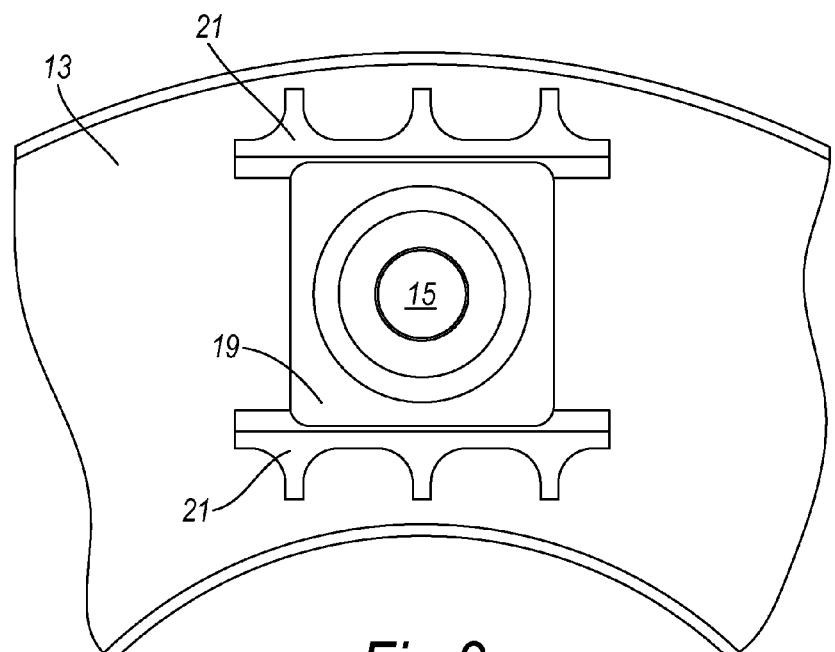
FIG. 3 is an end-on view of the joint in the slat assembly of FIG. 1.

FIGS. 2 and 3 show the joint 13 in more detail; FIG. 2 is a close-up plan view of the joint 13, and FIG. 3 is an end-on view of the joint. The joint 13 comprises a, rigid, longitudinally-extending shaft 15 extending from a web 17 on the end of the first slat 3. The shaft 15 is received in a spherical bearing 19 held on two longitudinally-extending arms 21 extending from a web on the end of the second slat. The regions 25, 27 at the end of each slat are strengthened by way of stiffeners (not shown) to inhibit deformation of the slats (including deformation of the webs 17, 23). The central portion of each slat is not stiffened and has been found to distort before a sufficient load is generated to set-off the other torque limiter 11d in the jammed slat.

The joint 13 is arranged to allow relative longitudinal movement between the slats 3, 5 (i.e. in a direction parallel to the longitudinal axis of the shaft 15) by the shaft moving in and out of the spherical bearing 19. The joint 13 is also arranged to allow relative rotation between the slats 3, 5 as a result of the spherical bearing 19 being freely moveable in the bearing housing 20, and the housing itself 20 is slideably mounted on the arms such that it is able to move vertically (i.e. into and out of the page in FIG. 2 and left-right in FIG. 3). The joint thus allows the slats 3, 5 to move relative to one another under the influence of thermal and/or aerodynamic effects acting of the slats. Under a pure (forward-aft) shear force however (such as that on the joint in the arrangement shown in FIG. 1), the shear load acts through the centre of the bearing 19, and the joint 13 transfers the shear load from the first slat 3 to the adjacent second slat 5.

Whilst the present invention has been described and illustrated with reference to a particular embodiment, it will be appreciated by those of ordinary skill in the art that the invention lends itself to many different variations not specifically illustrated herein. For example, the slat assembly may comprise a multiplicity of slats, each slat being located adjacent to another slat and adjacent slats being connected by a joint. The protection system may be independent of existing torque limiters. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft slat assembly comprising a first slat and a second slat positioned adjacent thereto and aligned therewith, the first and second slats being moveable between extended and retracted positions in which the first and second slats remain aligned,
    wherein the slats are connected by a joint, the joint prevents the slats becoming misaligned and the joint being arranged to transfer the shear load generated as the slats are being urged into a misaligned configuration, from one slat to the other slat, such that the shear load may be detected or otherwise used to identify the existence of a condition which could have lead to excess misalignment, before such misalignment actually occurs.

2. An assembly according to claim 1, wherein the slat assembly comprises an actuator system arranged to drive the slats between the extended and retracted positions.

3. An assembly according to claim 2, wherein the actuator system comprises a common drive means arranged to drive both the slats between the extended and retracted positions.

4. An assembly according to claim 2 further comprising a protector system, wherein the protector system is arranged to trip at least part of the actuator system in the event of an excessive load occurring in the actuator system.

5. An assembly according to claim 4 wherein the protector system is arranged to trip the actuator system when the magnitude of the shear load transferred from one slat to the other slat exceeds a threshold magnitude.

6. An assembly according to claim 1 wherein the joint comprises a rigid coupling between the slats, which substantially resists deformation under the shear load.

7. An assembly according to claim 1, wherein the joint is arranged to allow relative movement between the slats in a direction along the longitudinal axis of the slats.

8. An assembly according to claim 1, wherein the joint is arranged to allow relative rotation between the slats.

9. An assembly according to claim 1, wherein each slat comprises a first region proximal to the joint, and a second region distal from the joint, the first region being stiffer than the second region such that deformation of the slat in the first region, under the influence of the shear load, is inhibited.

10. An aircraft slat assembly comprising a first slat and a second slat positioned adjacent thereto and aligned therewith, the first and second slats being moveable between extended and retracted positions in which the first and second slats remain aligned,
    wherein the slats are connected by a joint, the joint permitting relative movement between the slats in at least some directions, but the joint prevents relative movement between the slats in the direction of extension/retraction of the slats, the joint thereby prevents the slats becoming misaligned.

* * * * *